July 5, 1932.    A. N. THOMAS    1,866,066
HYDRAULIC CLUTCH
Original Filed Dec. 24, 1928    2 Sheets-Sheet 1
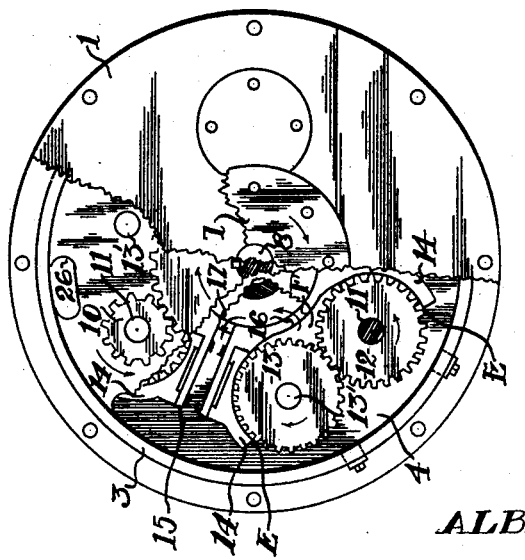
INVENTOR.
ALBERT N. THOMAS,
BY E. G. Charles
ATTORNEY.

July 5, 1932.  A. N. THOMAS  1,866,066
HYDRAULIC CLUTCH
Original Filed Dec. 24, 1928   2 Sheets-Sheet 2
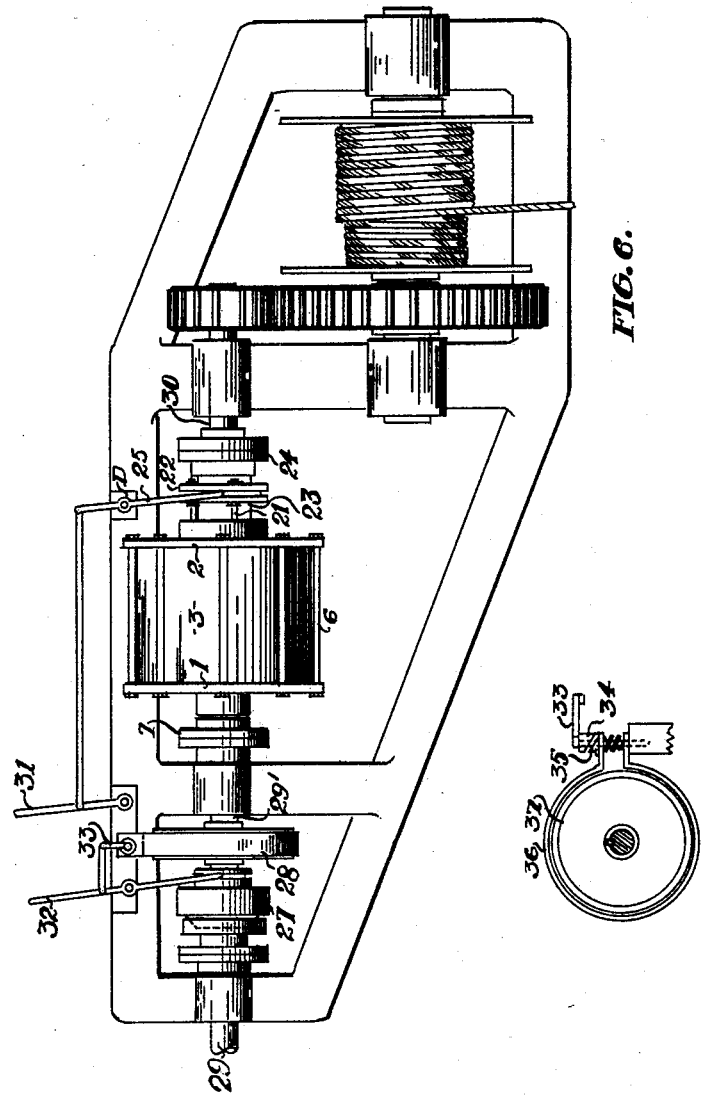
INVENTOR.
ALBERT N. THOMAS.
BY
ATTORNEY.

Patented July 5, 1932

1,866,066

UNITED STATES PATENT OFFICE

ALBERT N. THOMAS, OF WICHITA, KANSAS

HYDRAULIC CLUTCH

Application filed December 24, 1928, Serial No. 328,086. Renewed November 12, 1931.

My invention relates to improvements in hydraulic clutches.

The object of my invention is to provide a hydraulic clutch composed of a plurality of gear pumps controlled by a piston type bypass valve and all mounted in a housing filled with a liquid for the engagement and release of a torque transmitted by a driving to a driven shaft.

Another object of my invention is to provide a hydraulic clutch mechanism the engagement of which depends upon the liquid pressure accumulated by a plurality of gear pumps driven from a central member in planetary arrangement and for which the adjacent compression walls are adjustable.

A still further object of my invention is to provide a hydraulic clutch transmission consisting of a plurality of gear pumps, in planetary engagement with a central gear member, with the hydraulic element or fluid functioning as a lubricant during the rotation of the gears.

A still further object of my invention is to provide a hydraulic clutch in combination with a dry clutch of the cone type or the like and a brake mechanism for use on hoists or winches in which case the hydraulic clutch can be used as a brake during the lowering of the load.

A still further object of my invention is to provide a hydraulic clutch mechanism controlled by a piston type valve, the function of the same being impervious to the centrifugal force of the transmitted rotation and simple in design and character.

Reference being had to the accompanying drawings which form a part of this specification and wherein like characters apply to like parts in the different views.

Referring to the drawings:

Fig. 1 is an end view of the driving end of the clutch with parts broken away and in section for the purpose of illustration.

Fig. 2 is a side view of the clutch with parts removed and in section for illustrative purposes.

Fig. 3 is a fragmentary longitudinal section with regard to the valve seat.

Fig. 4 is a side view of the by-pass valve.

Fig. 5 is a cross section of the bypass valve taken on the line 5—5 in Fig. 4.

Fig. 6 is a plan view of the clutch installed on a winch in combination with a cone clutch and band brake.

Fig. 7 is an elevation of the band brake indicating its actuating levers and cams.

A cylindrical housing, composed of the end plates 1 and 2 and the central member 3 the latter having a web wall 4 and valve seat 5 integral therewith, has a flanged connection at either end and is held together by the stay bolts 6 in the manner shown.

The flange 7 provides the connection for the driving means. The flange 7 is keyed to shaft 8 and trunnioned in the end plate 1 as shown. A center gear 9 is keyed to the shaft 8 and rotatable therewith. The center gear 9 is in mesh with the planetary gears shown as trunnioned at A, B, and C in the members 1, 4 and 2 respectively and carrying the driving pump gears 12 to participate in the rotation. The driving pump gears 12 are in mesh with idle pump gears 13 on the shaft 13' trunnioned at points equivalent to B and C. Compression walls 14 are machined to the periphery of the teeth of the gears 12 and 13, and are adjustably positioned by means of stud bolts and shims on bases 15. Release ports 16 and circulation ports 17 are positioned in the valve seat 5 as shown.

A piston type by-pass valve 18 is positioned slidably in the valve seat. The valve has a plurality of discs 19 integral with a hollow center member 20. Slide bolts 21 threadedly engage the valve and pass through the end plate 2 as shown. The slide bolts 21 are rigidly connected to a collar 22 slidably mounted on the shaft extension 23, the latter being integral with the end plate 2 and keyed to the flange 24. This flange serves as a shaft connection for the driven end of the clutch. The control lever 25, rockably mounted at D, slidably engages the collar 22 as shown and is responsible for the position of the latter, and also the valve to which the collar is connected.

A torque applied to the flange 7, in clockwise direction results in rotation of the various gears as indicated by the arrows. The fluid or oil contained in the housing is carried by the teeth of the gears from the points indicated at E into the space shown at F. The valve 5 being in the position shown in Fig. 2 the oil passes through the ports 16 in the valve and back through the ports 17 to a repetition of the described circulation started at E. The ports 26 in the member 4 serve to distribute the oil throughout the housing for lubrication. Under these conditions the housing which is rotatable with the driven flange 24 remains stationary.

A movement of the lever arm 25 in the direction shown by the arrow makes the discs 19 cover the ports 16 and 17 and causes a compression in the chambers at F, which, when of sufficient magnitude, will oppose the rotation of the gears 12 and 13 to a point of stoppage. The stopping or locking of these gears will transmit the torque applied at the flange 7 directly to the housing and the flange 24.

Thus the participation of the rotation of the flange 24 with the flange 7 is dependent upon the position of the lever 25.

In Fig. 6 I have illustrated my invention in combination with a band brake and a cone type clutch for use on a winch.

The driving means, not shown being connected to the shaft 29.

The cone clutch 27, and the band brake mechanism 28 are mounted on the shafts 29 and 29' as shown, with the shaft 29' connected to the flange 7. The flange 24 of the hydraulic clutch is connected to the shaft 30 which drives the winch mechanism as illustrated. The lever 31 controls the movement of the lever 25 for engagement or release of the hydraulic clutch. The lever 32 controls the release or engagement of the cone clutch and the movement of the lever 33 of the brake assembly 28. By reason of the cams 34 and 35 on the brake assembly the band 36 grips the drum 37 upon movement of the arm 33, the brake engaging upon the release of the cone clutch 27.

In the arrangement shown in Fig. 6 with the cone clutch in engagement and the brake in release, the hydraulic mechanism is operable as a clutching means.

To facilitate the lowering of a load, raised by the hoist, the hydraulic mechanism is placed in engagement by the lever 31. The lever 32 is reversed to disengage the cone clutch 27 and engage the brake 28. The lever 31 now controls the lowering of the load by its movement transmitted to the hydraulic mechanism for release to rotation of the shaft 30.

In the occasion illustrated the hydraulic clutch serves as both a brake and a clutch.

An advantage of my invention is the valve control mechanism which is not affected by centrifugal force.

Also the pumping action is purely hydraulic, there being no vanes or wings in frictional engagement with side walls. The gear teeth of the pumping gears are to be in clearance, although slight, from the compression walls.

I do not wish to be restricted to any particular material or manner of fabrication and such modifications may be employed as lie within the scope of the appended claims, and what I do claim as new and desire to secure by Letters Patent is:

1. In a hydraulic clutch mechanism, a driving member, a system of planetary gears rotatable with respect to the driving member, fluid compressing gears rotatable with the planetary gears, compression walls about the compressing gears having fluid openings therein, means for adjusting the compression walls relative to the peripheries of the compressing gears, a cylindrical or piston by-pass valve slidably arranged within the clutch mechanism past the fluid openings, controlling the magnitude of fluid compression from the compressing gears to retard circulation of fluid, thereby opposing the rotation of the compression gears and transmitting the force of rotation from the driving to the driven member of the mechanism.

2. In a hydraulic clutch mechanism, a housing containing a hydraulic fluid, a driven shaft connected to the housing, gears in said housing in planetary arrangement, gear pumps rotatable with said first gears, the first gears and the gear pumps being rotatable with the shaft, a piston tight by-pass valve, a cylindrical valve seat having circulation ports, cut-off discs on the valve, slidable with the valve in the valve seat to retard the circulation of oil in the valve seat thereby damming the fluid circulation of said gear pumps to provide a pressure against the rotation of the component gears of the gear pumps and opposing the rotation of the planetary arrangement to the driving shaft to transmit the rotation of the driving shaft to the housing and driven shaft for the purpose of a clutch or brake.

3. In a hydraulic clutch mechanism, a housing having liquid therein, planetary gears in the housing including a center gear, a shaft connected to the center gear, gear pumps rotatable with the planetary gears, a cylindrical valve seat having circulation ports, a hollow cylindrical valve slidable in the seat having ports to aline with the ports in the valve seat to vary the effective port areas of the circulation ports to vary the torque between the housing and the planetary gears.

In testimony whereof I affix my signature.

ALBERT N. THOMAS.